United States Patent
Grundy

[11] 3,832,599
[45] Aug. 27, 1974

[54] VITAL MORE RESTRICTIVE SPEED COMMAND SENSING CIRCUIT

[75] Inventor: Reed H. Grundy, Murrysville, Pa.

[73] Assignee: Westinghouse Air Brake Company, Wilmerding, Pa.

[22] Filed: Aug. 15, 1973

[21] Appl. No.: 388,371

[52] U.S. Cl............... 317/5, 317/151, 317/148.5 R
[51] Int. Cl....................... H01h 47/00, H01h 47/32
[58] Field of Search................ 317/151, 5; 343/8.6; 340/268; 246/187

[56] References Cited
UNITED STATES PATENTS

| | | | |
|---|---|---|---|
| 3,047,778 | 7/1962 | Gibson, Jr. | 317/151 |
| 3,251,312 | 5/1966 | Livingston | 317/5 |
| 3,353,019 | 11/1967 | Allen | 246/187 R |
| 3,378,836 | 4/1968 | Joy et al. | 343/6 |
| 3,469,091 | 9/1969 | Wrege | 246/187 R |
| 3,527,986 | 9/1970 | Darrow | 317/5 |
| 3,682,512 | 8/1972 | Malon et al. | 303/20 |
| 3,696,356 | 10/1972 | Franke et al. | 340/213.1 |
| 3,699,563 | 10/1972 | Cass | 340/268 |

*Primary Examiner*—L. T. Hix
*Attorney, Agent, or Firm*—R. W. McIntire, Jr.; J. B. Sotak

[57] ABSTRACT

This disclosure relates to a vital type of more restrictive vehicle speed command sensing circuit arrangement including a speed decoding unit, a switching circuit, a storage circuit and an acknowledging circuit. When a more restrictive speed command is received, the switching circuit is rendered conductive. The conduction of the switching circuit causes the acknowledging circuit to be activated by the storage circuit thereby acknowledging the reception of a more restrictive speed command.

10 Claims, 1 Drawing Figure

PATENTED AUG 27 1974
3,832,599
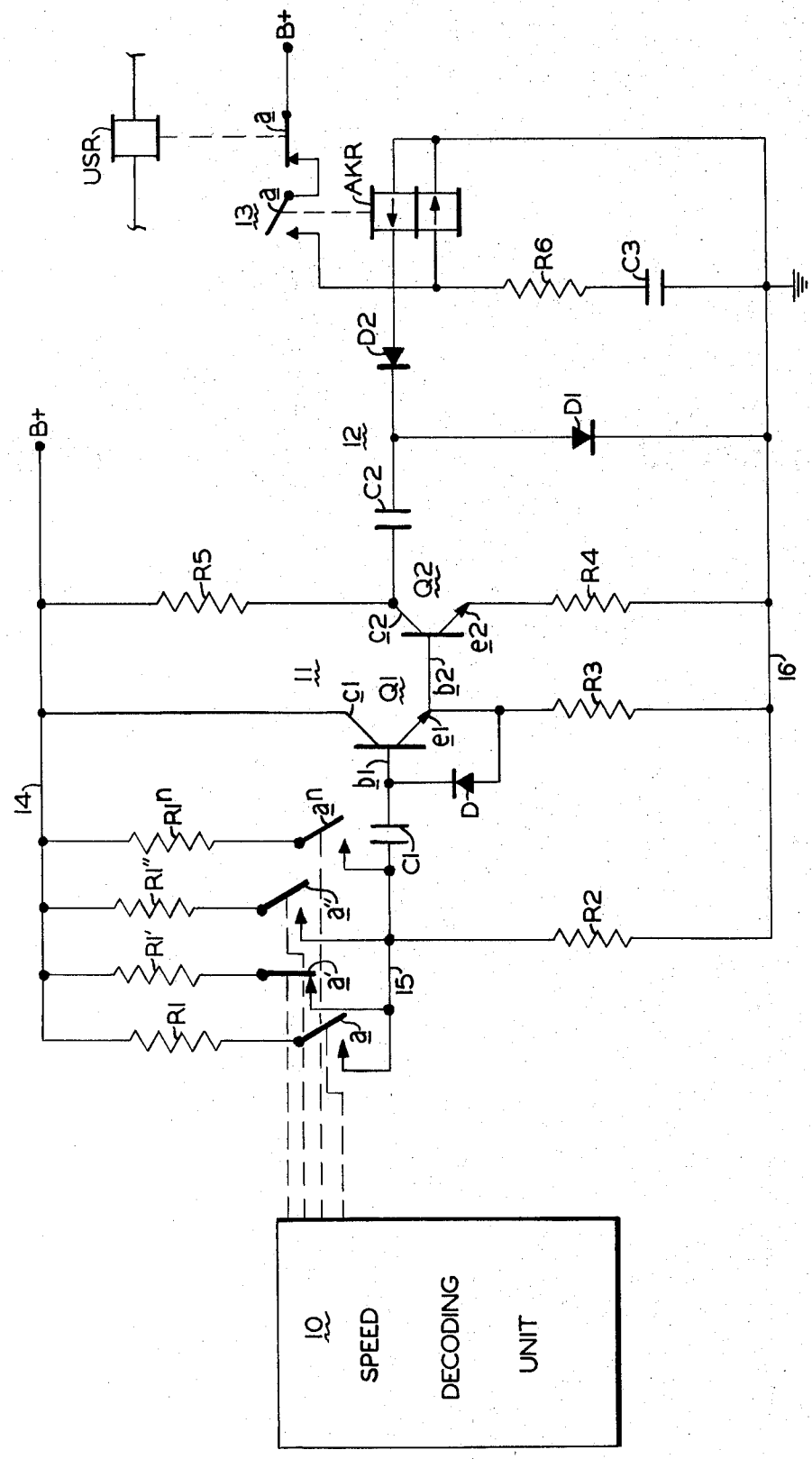

VITAL MORE RESTRICTIVE SPEED COMMAND SENSING CIRCUIT

BACKGROUND OF THE INVENTION

This invention relates to a vital type of vehicle downward speed sensing arrangement and more particularly to a fail-safe more restrictive cab signal speed command recognition circuit for detecting and acknowledging the reception of a decrease in speed request onboard the vehicle.

In railway and mass and/or rapid transit systems, it is common practice to convey the various speed commands to the vehicle or train via cab signaling. The cab signal command signals may take the form of coded carrier waveforms where the code rate determines the given speed that the vehicle or train is to travel within the given block or track section. The coded or modulated speed command signals are inductively coupled from the track rails to the vehicle through magnetic pickup devices. The picked-up modulated carrier signals are amplified, demodulated, shaped, limited, and decoded or filtered and are then employed to control the positive and negative tractive equipment to effective accelerate or decelerate the vehicle or train. It has been found that during an automatic train operation (ATO), the reception of a more restrictive speed command must immediately initiate a full service braking application. The brakes should remain applied until the speed is reduced to a point which is slightly above the last received restrictive speed command level. In practice it has been observed that it is advantageous to release the service brakes approximately 3 mph in excess of the most recently received speed command. The pre-release of the service brakes prevents the vehicle from undershooting the desired speed by allowing the decelerating vehicle to glide smoothly onto the newly ordered rate of motion. That is, the release of the brakes in advance of the last command speed level prevents the vehicle from undergoing a hunting action. It will be appreciated that hunting is undesirable in that it is detrimental and damaging to the propulsion motor and braking equipment and is also uncomfortable and irritating to the passengers.

Further, it will be appreciated that all vital portions of a vehicle speed control system for commuter service must operate in a fail-safe manner. That is, under no circumstance should a critical circuit or component failure be capable of simulating a true or valid condition. Thus, it is of utmost importance to exercise extreme care in designing and constructing each specific portion of control apparatus in order to maintain the security and integrity of the overall control system. Accordingly, only then is it possible to provide the highest degree of safety to individuals and to obtain the utmost usage of the vehicular equipment.

Accordingly, it is an object of this invention to provide a vital type of a more restrictive cab signal sensing circuit.

A further object of this invention is to provide a fail-safe vehicle downward speed sensing arrangement.

Another object of this invention is to provide an improved electronic more restrictive speed command signal recognition circuit for cab signaling.

Yet a further object of this invention is to provide a novel speed reduction sensing circuit which operates in a fail-safe manner.

Yet another object of this invention is to provide a unique circuit arrangement for sensing and acknowledging an order to decrease in the speed of a moving vehicle.

Still a further object of this invention is to provide an improved speed reduction recognition circuit arrangement for railway and mass and/or rapid transit operations.

Still another object of this invention is to provide a vital type of more restrictive speed sensing circuit for cab signal systems.

An additional object of this invention is to provide a fail-safe vehicle downward speed signal command recognition arrangement employing a decelerating detecting network, a switching circuit, a storage circuit, and an acknowledging circuit.

Furthermore, an object of this invention is to provide a new and improved more restrictive cab signal speed command sensing circuit which is economical in cost, simple in design, reliable in operation, durable in use, and efficient in service.

In accordance with the present invention, the fail-safe or vital type of more restrictive speed sensing circuit arrangement includes a speed decoding unit, a switching circuit, a storage circuit and an acknowledging circuit. The speed decoding unit is supplied with coded cab signal commands which are inductively picked up from the track rails. The coded signals are amplified, demodulated, shaped, limited, and decoded by, for example, active filters. Each active filter controls the conductive condition of a separate electromagnetic relay which selectively either opens or closes an associated front contact. The front contacts are connected by separate companion biasing resistors to the input of the switching circuit. The switching circuit includes a pair of cascaded transistor amplifying stages. The output of the switching circuit is coupled to the storage circuit. The storage circuit includes a capacitor which is charged when the switching circuit is nonconducting and which is discharged when the switching circuit is conducting. The acknowledging circuit includes a dual coil polar sensitive electromagnetic relay. One of the dual coils of the electromagnetic relay is energized during the discharging of the storage capacitor. The energization of the one coil causes the closing of a front contact which provides a stick circuit for the other of the dual coils of the electromagnetic relay. Interruption of the stick circuit causes the relay to release after a time delay which is provided by a series R-C circuit. Thus the acknowledging relay is only energized when a downward or a more restrictive speed command is picked up and sensed by the speed decoding unit.

The following objects and other attendant features and advantages will be more readily appreciated as the subject invention becomes better understood by reference to the following detailed description when considered in conjunction with the accompanying drawing wherein:

The single FIGURE is a schematic circuit diagram of a vital or fail-safe more restrictive cab signal command sensing circuit arrangement embodying the principles of the present invention.

Referring to the single FIGURE of the drawing, there is shown a preferred embodiment of the vital or fail-safe more restrictive speed command sensing or downward speed recognition circuit arrangement of the present invention. The vital more restrictive speed command sensing circuit is composed of a speed decoder or decoding unit 10, a switching circuit 11, a storage circuit 12, and an acknowledging circuit 13. Normally, the input signals take the form of coded carrier wave forms which are inductively picked up from the track rail by suitable inductance coils carried by the transit vehicle or leading car of a train. The picked-up coded carrier input signals are then applied to the car-carried receiver which includes a high gain amplifier for appropriately increasing the voltage level of the input signals. The amplified signals are then demodulated in a suitable manner to remove the carrier frequency so that the code rate or modulating frequency signal can be suitably shaped and limited by an appropriate shaper or limiter circuit. The code rate or frequency of the modulating signal is then applied to a suitable speed decoder or decoding unit 10 in the form of a plurality of active filter circuits, the output of which is selectively employed to energize a given one of a plurality of vital electromagnetic relays. As shown, each of the four dashed lines emanating from the deceleration detecting network 10 is, in fact, the mechanical connection which controls the positions of the respective front contacts $a$, $a'$, $a''$, and $a^n$. It will be understood that the contact $a$ is the least restrictive, contact $a'$ is the second least restrictive, contact $a''$ is the third least restrictive, and contact $a^n$ is the most restrictive. As shown in the drawing, contact $a'$ is closed while contacts $a$, $a''$, and $a^n$ are in their open positions. Thus, it will be assumed that the last received cab signal speed command had a code rate or frequency which was effective to energize the electromagnetic relay that controls the front contact $a'$. It will be noted that the heel of contact $a$ is connected to resistor R1 while the heel of contact $a'$ is connected to resistor R1'. Similarly, the heel of contact $a''$ is connected to resistor R1'', and the heel of contact $a^n$ is connected to resistor R1$^n$. The upper ends of resistors R1, R1', R1'' and R1$^n$ are connected in common to lead or conductor 14 which is connected to the B+ terminal of a suitable source of d.c. operating voltage (not shown). The points of contacts $a$, $a'$, $a''$, and $a^n$ are connected to a common input lead 15. A resistor R2 is connected between the input lead 15 and a reference potential or ground lead 16. Thus, it will be appreciated that the resistor R2 and a respective one of the resistors R1, R1', R1'', and R1$^n$ form a voltage dividing network which supplies d.c. operating voltage to the active portion of the switching circuit 11.

It will be appreciated that the resitances of the resistors R1, R1', R1'' and R1$^n$ are of different values and, in fact, it will be noted that the resistance value of resistor R1 is greater than the resistance value of resistor R1', the resistance value of resistor R1' is greater than the resistance value of resistor R1'', and the resistance value of resistor R1'' is greater than the resistance value of resistor R1$^n$. In practive it has been found desirable to select the resistance values of the resistors to have equal variations between any two succeeding resistors for the purpose of symmetry. Further, it is understood that since timing is not a crucial factor, the resistance values may increase or decrease in a random fashion. A coupling capacitor C1 is connected between the common input lead 15 and the input circuit of the first stage of the switching circuit 11.

As shown, the switching circuit 11 includes a pair of cascaded stages including NPN transistors Q1 and Q2. The input NPN transistor Q1 includes a base electrode $b1$, an emitter electrode $e1$, and a collector electrode $c1$. As mentioned above, the base electrode $b1$ is connected to the coupling capacitor C1 while the collector electrode $c1$ is directly connected to the positive voltage supply lead 14. A diode D is connected across the base electrode $b1$ and the emitter electrode $e1$ of transistor Q1. The purpose of the diode D is to completely discharge the capacitor C1 so that no residue voltage will remain on the capacitor. The diode D also protects the transistor Q1 against failure by preventing zener breakdown from occurring across the emitter base junction. The emitter electrode $e1$, which forms the output of the first stage, is coupled to the ground lead 16 via resistor R3. The output stage also includes an NPN transistor Q1 having a base electrode $b2$, an emitter electrode $e2$, and a collector electrode $c2$. As shown, the base electrode $b2$ of transistor Q2 is directly connected to the emitter electrode $e1$ of transistor Q1. The emitter electrode $e2$ of transistor Q2 is connected to the ground lead 16 via resistor R4 while the collector electrode $c2$ of transistor Q2 is connected to the positive voltage supply lead 14 via resistor R5. The output is derived from the collector electrode $c2$ of transistor Q2 which is shown as the input to the storage circuit 12.

The storage circuit 12 includes the capacitor C2, a charging diode D1, and a discharging diode D2. As will be described in greater detail hereinafter, the charging path extends from the terminal B+ through resisor R5, capacitor C2, diode D1, to the ground lead 16. Conversely, the discharging circuit of the capacitor C2 includes the collector electrode $c2$ and the emitter electrode $e2$ of transistor Q2, through resistor R4, through the pickup coil of the acknowledging circuit, and through the diode D2. Thus, the potential charge on capacitor C2 is employed to supply energizing current to the acknowledging circuit 13, as will be described presently.

As shown, the acknowledging circuit 13 includes a polar biased electromagnetic relay AKR having an upper pickup and a lower holding coil winding, each of which is only sensitive to current flowing in the direction as illustrated by the arrows. The initial energization of the upper pickup winding causes the closing of front contact $a$ of acknowledging relay AKR which, in turn, normally results in establishing a stick circuit for the lower holding coil. As previously mentioned, the upper pickup coil of relay AKR forms part of the discharge circuit path for capacitor C2. The stick circuit for the lower holding coil of relay AKR extends from the positive voltage terminal B+, which may be the same voltage source as that applied to lead 14 through normally closed back contact $a$ of an underspeed relay USR, over contact $a$ of relay AKR, through the lower holding winding of acknowledging relay AKR to the ground lead 16. The positive voltage terminal B+ is also connected to ground over contacts $a$ of relays USR and AKR, through resistor R6, and capacitor C3, the purpose of which will be described in detail hereinafter.

Turning now to the operation of the present invention, it will be initially assumed that the vehicle or train is traveling along at a speed in which the last speed command was effective in energizing the coded relay that controlled the front contact $a'$. Upon the reception of the last speed command, the front contact $a'$ became closed and will remain closed until a subsequent speed command is received onboard the vehicle. It will be appreciated that under no circumstance is more than one front contact of the coded relays capable of being closed at the same time. Let us further assume that the existing condition has prevailed for some time so that the capacitor C1 is no longer drawing current and the entire circuit is in the quiescent condition, as illustrated in the drawing. During the quiescent condition, the transistors Q1 and Q2 of the switching circuit 11 assume a nonconductive condition in that no base current flows into either transistor Q1 or Q2 to the stabilization of the voltage across capacitor C1. When the transistor Q2 is nonconducting a charging path exists from the positive voltage terminal B+ through resistor R5, through capacitor C2, through diode D1, to the ground lead 16, as mentioned above. After a period of time, dependent upon the RC time constant of the charging circuit, the capacitor C2 charges to substantially a voltage equal to the B+ supply potential. It will be appreciated that the nonconduction of the transistor Q2 also interrupts or ensures that a circuit path is not available for the upper pickup coil of the acknowledging relay AKR. Thus, contact $a$ of relay AKR is opened and, therefore, the stick circuit for the lower holding coil or relay AKR is also interrupted. The circuit arrangement will remain in this condition so long as a more restrictive speed command signal is not picked up and applied to the deceleration detecting network 10.

Let us now assume that a more restrictive speed command signal is being induced into the pickup coils and being received onboard the vehicle. Under this condition the car-carried equipment amplifies, demodulates, shapes, and limits the coded frequency so that either the third or fourth more restrictive coded relay will be energized. The presence of the more restrictive speed command signal obviously results in the disappearance of the second least restrictive code signal so that the front contact $a'$ is open due to the deenergization of its relay. In all likelihood, the latest more restrictive speed command signal is effective in closing the front contact $a''$ by the energization of its code frequency relay. The closing of the contact $a''$ results in the completion of a d.c. circuit path between the positive voltage terminal B+ and ground trhough resistors R1'' and R2. The resulting change in resistance increases the amount of positive voltage on input lead 15. The increase in the potential level on input lead 51 causes capacitor C1 to begin charging and thus current flows into the base electrode $b1$ of transistor Q1. The flow of current into the base electrode $b1$ causes transistor Q1 to become conductive and this, in turn, results in the conduction of the output stage, namely, transistor Q2. The conduction of the output transistor Q2 establishes a discharge circuit path for the capacitor element C2. That is, current flows from capacitor C2 through the collector-emitter electrodes $c2$–$e2$, respectively, through resistor R4, through the upper pickup coil of relay AKR, through diode D2, and back to the capacitor C2. Thus, the current flow through the pickup coil energizes the relay AKR and closes its front contact $a$. The closing of the contact $a$ of relay AKR establishes a stick circuit for the lower holding coil of relay AKR. That is, current is supplied from the positive voltage terminal B+ over contact $a$ of relay USR, over contact $a$ of relay AKR, through the lower holding winding, to ground lead 16. While the current from capacitor C2 to the pickup coil of relay AKR is quickly dissipated, the contact $a$ of relay AKR remains closed due to the energization of the lower holding coil of relay AKR by the stick circuit. It will be seen that the closing of the front contact $a$ of relay AKR also establishes a charging path for the capacitor C3 through resistor R6, and thus a potential charge would be built up upon the capacitor C3. Now when the capacitor C1 becomes fully charged to the new level on lead 15, no further current is drawn by the base electrode $b1$ of transistor Q1 so that both of the transistors Q1 and Q2 are rendered nonconductive.

It will be appreciated that when transistor Q2 becomes nonconductive a charging path for capacitor C2 is established from the positive voltage terminal B+, through resistor R4, and diode D1 to ground. Thus, the capacitor C2 will assume a charge which is substantially equal to the B+ power supply voltage level in due time. It will be appreciated that during this time, namely, from the reception of the more restrictive signal to some point in time, the vehicle is decelerating or being slowed down due to the application of the service brakes. At a given point above the last received speed command signal level, namely, 3 mph above the last speed command signal level, the underspeed relay USR will become energized and the service brakes are released. Energization of relay USR results in the opening of its back contact $a$ which, in turn, interrupts the stick circuit of the acknowledging relay AKR. The relay AKR is not immediately deenergized due to the charge of capacitor C3 which momentarily retains the relay AKR picked up. After a predetermined period of time, namely, approximately two seconds, the charge on capacitor C3 is sufficiently decreased to allow the relay AKR to become released and open its front contact $a$. At this time the vehicle should be at the last received signal command level, and thus the service brakes are not reapplied if the vehicle is, in fact, at the appropriate level. However, if the vehicle has not reached the last received speed command level, the service brakes are again applied to decelerate the vehicle. Subsequent operation is initiated when a further more restrictive condition, namely, the closing of contact $a^n$ is established, which effectively increases the voltage level on input lead 15. It will be appreciated that if contact $a'$ or $a$ is closed, no action takes place since the voltage on input lead 15 is decreased and thus no current will flow into the base of transistor Q1 to render it and, in turn, transistor Q2 conductive. It will be appreciated that the opening of the relay USR will also control an appropriate circuit which operates in conjunction with the network that controls the service brakes circuit.

It will be appreciated that the presently described circuit is fail-safe in that the opening of the various active and passive elements either destroys the a.c. amplifying, d.c. biasing, integrity, or continuity characteristics of the circuit. For example, the opening of diode D2 destroys the discharge path for the capacitor C2 while the opening of diode D1 interrupts the charging path for capacitor C2. The opening of the various elements, such as resistors, either removes the necessary biasing or operating potential for the transistors Q1 and Q2 or destroys the output circuit, namely, by interrupting the circuit path to the acknowledging relay AKR. In addition, the shorting of the various elements either causes them to fail to a safe condition or renders the complete circuit inactive.

It will be appreciated that the present invention finds particular utility in cab signaling equipment and in particular to the sensing of a downward speed or more restrictive signal to control and recognize a decrease in speed command and, in turn, cooperate with the service brakes. However, it is understood that the invention may be employed in other equipment and apparatus which have the need of such operation. In addition, it is understood that other changes, modifications, and alterations may be employed without departing from the spirit and scope of this invention. For example, PNP transistors may be used in place of the NPN transistors shown in the drawing by changing the d.c. supply voltage and by reversing the polarity of diodes D1 and D2.

Thus, it should be understood that the showing and description of the present invention should be taken in an illustrative or diagrammatic sense only.

Having now described the invention what I claim as new and desire to secure by Letters Patent, is:

1. A more restrictive vehicle speed sensing arrangement comprising, a speed decoding unit responsive to a more restrictive speed command signal, a switching circuit coupled to said speed decoding unit, a storage circuit coupled to said switching circuit, and an acknowledging circuit coupled to said storage circuit and being activated by said storage circuit when said switching circuit is rendered conductive by said speed decoding unit.

2. A more restrictive vehicle speed sensing arrangement as defined in claim 1, wherein said acknowledging circuit includes an electromagnetic relay having multiple windings.

3. A more restrictive vehicle speed sensing arrangement as defined in claim 1, wherein said storage circuit includes a capacitor.

4. A more restrictive vehicle speed sensing arrangement as defined in claim 1, wherein said switching circuit includes a pair of cascaded NPN transistors.

5. A more restrictive vehicle speed sensing arrangement as defined in claim 1, wherein said speed decoding unit controls a plurality of electrical contacts each of which varies the input resistance to said switching circuit.

6. A more restrictive vehicle speed sensing arrangement as defined in claim 1, wherein said acknowledging circuit includes a relay having a first winding which is energized by said storage circuit and which closes a stick circuit for a second winding of the relay.

7. A more restrictive vehicle speed sensing arrangement as defined in claim 1, wherein said storage circuit includes a capacitor which is charged when said switching circuit is nonconducting and which is discharged when said switching circuit is conducting.

8. A more restrictive vehicle speed sensing arrangement as defined in claim 1, wherein said acknowledging circuit includes a polar biased electromagnetic relay.

9. A more restrictive vehicle speed sensing arrangement as defined in claim 8, wherein said polar biased electromagnetic relay includes a pickup coil and a holding coil.

10. A more restrictive vehicle speed sensing arrangement as defined in claim 1, wherein said storage circuit includes a capacitor which is charged when said switching circuit is cut off and which energizes said acknowledging circuit when said switching circuit is rendered conductive.

* * * * *